W. A. HICKS.
SEED PLANTER.
APPLICATION FILED SEPT. 30, 1918.

1,291,882.

Patented Jan. 21, 1919.

Inventor
Wm. A. Hicks

By Wm. V. Liff
Attorney

UNITED STATES PATENT OFFICE.

WILLIAM A. HICKS, OF CHILLICOTHE, ILLINOIS.

SEED-PLANTER.

1,291,882.

Specification of Letters Patent.

Patented Jan. 21, 1919.

Original application filed March 21, 1918, Serial No. 223,698. Divided and this application filed September 1918. Serial No. 256,305.

*To all whom it may concern:*

Be it known that I, WILLIAM A. HICKS, a citizen of the United States, residing at Chillicothe, in the county of Peoria and State of Illinois, have invented certain new and useful Improvements in Seed-Planters, of which the following is a specification.

My invention relates to seed planters.

More particularly my invention relates to a planter designed especially for planting garden seed.

The object of my invention is to provide a planter that will freely distribute seed by the automatic action of the planter parts through a suitable timing of delivery of seeds, graduation of the same and conjunctive appliance adapted to fix delivery and prevent clogging.

Also my invention contemplates adjustability of parts relatively to facilitate the handling and proper planting of a great variety of garden seeds.

My invention consists in the application to a transportable structure, a container for seed, a specially formed seed disk, operative in connection with said seed hopper, the latter capable of adjustment to accommodate placement thereof relative to the seed disk, that plural sets of seed delivery openings in the seed plots may be caused to register with the hopper to facilitate general use of the machine for seed planting.

The general characteristics of my invention hereinabove specified are embodied in and form a part of my application for seed planters, filed March 21, 1918, Patent 1,280,468, issued Oct. 1, 1918, of which this is a division, and the particular features divided out of such application relate to the seed disk, the hopper and their relative arrangement and working relations.

Figure 1:
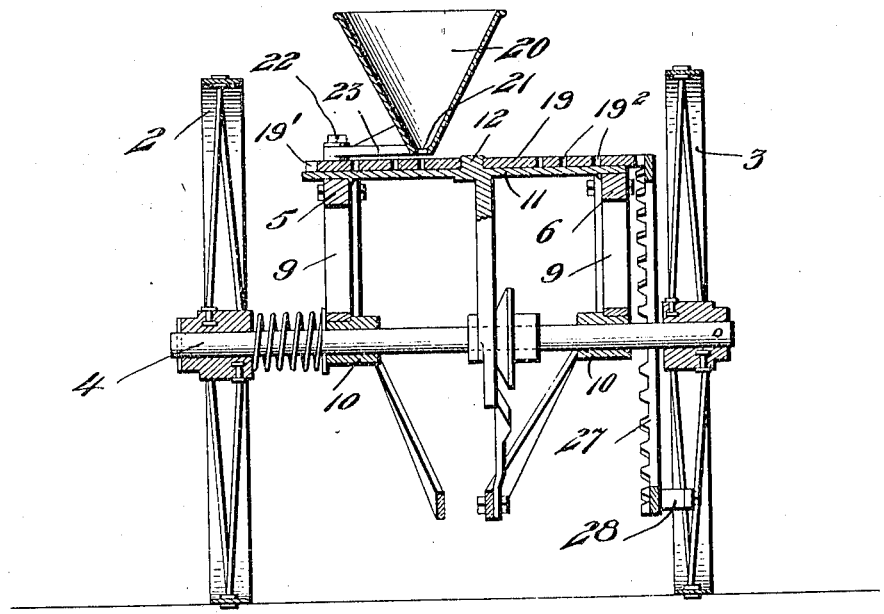
Figure 2:
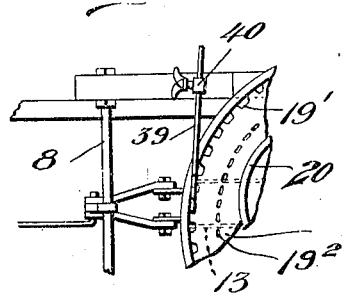
Figure 3:
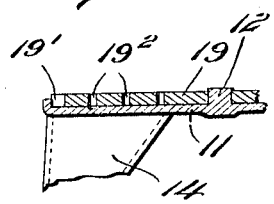
Figure 4:
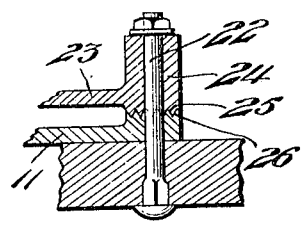
Figure 5:
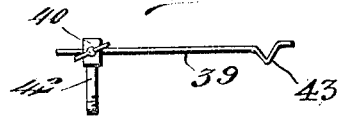

Referring to the drawings—Figure 1 is a vertical sectional view of the body of the machine. Fig. 2 is a fragmentary plan view of disk 19, showing application of spring arm 39. Fig. 3 is a vertical sectional view partly broken away showing the manner of relating a seed plate to a support and of a connected chute. Fig. 4 is a detail sectional view with parts broken away to illustrate the manner of pivoting a hopper with relation to the machine. Fig. 5 is a detail view of a seed forcing member.

Referring to the drawings—

2 and 3 are vehicle wheels. 4 is an axle; wheel 3 is designed to be fixed with relation to axle 4 and wheel 4 is designed to turn freely on the axle.

5 and 6 are framing members; 8 is a spacing rod at the rear of the frame. 9 are bracket members secured to the frame and are attached also to the sleeve member 10 on axle 4. Any suitable draft member may be attached to the frame. The frame above referred to is designed to be movable lengthwise of shaft 4 for purposes hereinafter described.

Upon the framing members 5 and 6 is mounted a plate 11 provided with a central stud 12, said plate being provided with an opening 13 (indicated by dotted line in Fig. 2). About this opening is attached a chute 14 which depends therefrom and is intended to deliver seed to a shank part of a shoe member.

On the top of plate 11 is mounted a seed plate 19 provided with a central opening registering with stud 12 on the supporting plate and is designed to turn thereabout. Plate 19 is provided with notches 19' about its periphery and with a series of rows of perforations $19^2$ between its center and periphery, the perforations in each row being of different sizes to accommodate planting seed of various size and quantity. The rows of perforations and peripheral notches are arranged with reference to chute 14 so that each of said rows and the peripheral notches lie within the path of such opening and as the seed disk is revolved the particular perforations of each row and the set of peripheral notches will at certain times, be carried over said opening.

For the purpose of delivering seed to the seed disk, I have provided the hopper 20 which has an opening in its bottom portion as at 21 (see Fig. 1) and is connected with a pivoting bolt member 22 by means of an integral arm 23, the latter being provided with a sleeve member 24 engaging said pivot bolt and provided with a clutch face 25 which is adapted to engage a similar clutch face member as 26 on supporting plate 11. By means of this manner of mounting of hopper 20 the latter may be swung about the pivot bolt 22 into different positions with reference to the surface of the seed plate to accommodate the registering of opening 21 in said hopper with the various rows of perforations in said seed plate, and this adjustment may be readily accomplished by loosening the nut on bolt 22 and it may be fixed in any desired position for registering with the different sets of openings by means of the clutch engaging parts 25 and 26 and thereby be held firmly in place.

I have provided means for turning the seed plate comprising a tooth wheel 27 fixed to wheel 3 by means of suitable clamps as 28. The teeth of this wheel are spaced relatively and with relation to the peripheral notches in the seed plate and so arranged relative to said plate that as said tooth wheel is revolved, it will cause the seed plate to be similarly revolved on its support 11, thus carrying the succeeding perforations in each series successively in register with the opening into chute 14 for the purpose of depositing seed carried within such openings to be discharged into said chute. It will be understood, of course, that seed will be delivered only to one set of openings at a time, the selection for such delivery of seed being made by the setting of the hopper for registering with whichever of the series of openings that may be desired.

Normally it is desired that the tooth wheel 27 and the seed plate 19 shall be in engagement through their tooth and notch members respectively. I accomplish this normal engagement by the interposition of the coil spring 29 between one of the supporting sleeves 10 of the frame and the hub of wheel 2. In the relation of such normal engagement, the machine will be operated to plant seed. As shown, I have provided means for releasing the driving connection between wheel 27 and seed plate 19, and for raising the planter shoe to facilitate transportation of the machine from place to place, but as this feature is not the subject of claim herein, is not described in detail.

The machine as above described, will under ordinary circumstances, operate successfully, but to insure the delivery or dislodgment of seed from perforations in the seed disk, I have provided spring arm 39 adjustably supported in set head 40 that it may be extended or withdrawn to effect different reaches for registry with the different sets of openings as particular openings of each set are in register with the hopper chute 14. The spring rod is set and held by means of thumb nut 41 carried in set head 40. Set head 40 is connected with a pivot bolt 42 (see Fig. 3) which is suitably connected with and supported from the frame and may be turned with reference to said frame to facilitate the operation of spring rod 39. Spring rod 39 is provided with a plunger member 43 which in this instance is formed by bending the spring rod into substantially V form near to its outer end. As the seed disk is revolved and the spring arm is set for registry with one or another of said sets of seed perforations, it will bear upon the face of the seed disk and as the openings are reached the plunger portion 43 thereof will descend into such opening and aid in expelling seed therefrom.

I have shown herein and described one form of embodiment of my invention for the purpose of exemplifying its uses and purposes; however, its parts may be materially modified, formed, rearranged, and generally differentiated from the particular parts and combinations of parts without departing from the spirit of my invention, and I therefore desire to extend my claims to the full extent of novelty presented.

What I claim is:

1. In a seed planter, in combination, a supporting frame, a seed plate support provided with an extended seed discharge way therein, a seed plate supported thereon and provided with openings arranged in circular sets and spaced relatively between the axis and periphery thereof, a hopper movably and periphery thereof, a hopper movably supported upon the frame and arranged relative to the seed plate for adjustment for registry with each of the plural sets of perforations in said seed plate, and means for turning the seed plate.

2. In combination with a seed planter, a seed plate support provided with a clearance or discharge way therein, a seed plate supported thereon and formed with plural rows of perforations therein spaced relatively between the axis and periphery of said seed plate, a hopper suitably supported for registry optionally with each of the said rows of perforations in the plate, and means for turning the plate.

3. In a seed planter, a support for a seed plate provided with a clearance or discharge way, a seed plate supported and turnable thereon, provided with peripheral notches and with plural rows of perforations spaced relatively between the axis and periphery of said plate, means operable in connection with the peripheral notches of the seed plate for turning the latter, a hopper disposed and related to the seed plate to facilitate optional registry with the discharge means therefrom with the peripheral notches of the seed plate and with each of the plural rows of perforations.

4. In a seed planter, in combination a support for a seed plate provided with a clearance or discharge way, a seed plate supported and turnable thereon provided with plural sets of seed ways, a plunger member, means for supporting the plunger member in a manner to facilitate longitudinal adjustment and for swinging movement, adapting it for optional register with each set of seed ways, and a seed hopper supported and related to the seed plate in a manner to facilitate optional delivery of seed to each set of seed ways therein.

5. In a seed planter, in combination, a support, a seed disk operable in conjunction therewith, provided with plural sets of seedways spaced relatively in circular sets to form rows and the rows spaced relatively at intervals between the axis and periphery of said disk, means for turning the plate, and a hopper suitably supported and related to the seed disk to facilitate optional registry with each row of seedways, and means for fixing the hopper in the several said optional positions.

6. In a seed planter, in combination a support for a seed plate provided with a clearance or discharge way, a seed plate suitably supported and turnable thereon comprising a disk shaped member provided with peripheral notches forming seed ways and with plural sets of seed way openings spaced relatively at intervals between the center and periphery thereof, a plunger member, means for supporting the plunger member in a manner to facilitate longitudinal adjustment thereof and for swinging movement, adapting it for optional register with each set of seed ways, and a seed hopper supported and related to the seed plate in a manner to facilitate optional delivery of seed to each set of seed ways therein.

In testimony whereof I affix my signature.

WILLIAM A. HICKS.

Copies of this patent may be obtained for five cents each, by addressing the "Commissioner of Patents, Washington, D. C."